US006447306B1

(12) United States Patent
Paredes et al.

(10) Patent No.: US 6,447,306 B1
(45) Date of Patent: Sep. 10, 2002

(54) PC CARD CONFIGURATION (75) Inventors: Vladimir Paredes; Karch Polgar; Mark S. Smith, all of San Jose, CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/795,505

(22) Filed: Feb. 28, 2001

(51) Int. Cl.[7] .............................................. H01R 12/00
(52) U.S. Cl. ...................... 439/76.1; 439/676; 439/639; 439/946; 361/686; 361/737
(58) Field of Search ............................. 439/76.1, 676, 439/638, 639, 946, 946.2, 945; 361/737, 686, 785

(56) References Cited

U.S. PATENT DOCUMENTS

| 2,916,720 A | 12/1959 | Steans ......................... 339/91 |
| 3,205,471 A | 9/1965 | Herrmann .................... 339/176 |
| 4,186,988 A | 2/1980 | Kobler ......................... 339/176 |
| 4,239,316 A | 12/1980 | Spaulding .................... 439/676 |
| 4,241,974 A | 12/1980 | Hardesty ...................... 339/154 |
| 4,303,296 A | 12/1981 | Spaulding .................... 339/122 |
| 4,352,492 A | 10/1982 | Smith ............................. 271/1 |
| 4,407,559 A | 10/1983 | Meyer .......................... 339/126 |
| 4,428,636 A | 1/1984 | Kam et al. ...................... 339/97 |
| 4,566,749 A | 1/1986 | Johnston .................... 339/95 D |
| 4,602,842 A | 7/1986 | Free et al. ................ 339/156 R |
| 4,647,136 A | 3/1987 | Kinoshita et al. ........ 339/125 R |
| 4,710,136 A | 12/1987 | Suzuki ......................... 439/374 |
| 4,778,410 A | 10/1988 | Tanaka ......................... 439/676 |
| 4,875,872 A | 10/1989 | Tanaka ......................... 439/344 |
| 4,915,648 A | 4/1990 | Takase et al. ................ 439/490 |
| 4,934,947 A | 6/1990 | Brummans et al. ............ 439/77 |
| 5,035,641 A | 7/1991 | Van-Santbrink et al. ..... 439/329 |
| 5,051,099 A | 9/1991 | Pickles et al. ............... 439/108 |
| 5,139,439 A | 8/1992 | Shie ............................. 439/359 |
| 5,183,404 A | 2/1993 | Aldous et al. ................. 439/55 |
| 5,184,282 A | 2/1993 | Kaneda et al. ............... 361/395 |
| 5,310,360 A | 5/1994 | Peterson ...................... 439/571 |

(List continued on next page.)

FOREIGN PATENT DOCUMENTS

| JP | 61-256850 | 8/1985 |
| WO | WO95/13633 | 5/1995 |

OTHER PUBLICATIONS

P.E. Knight and D.R. Smith, "Electrical Connector for Flat Flexible Cable," IBM Technical Disclosure Bulletin, vol. 25, No. 1, Jun. 1982.

Primary Examiner—Tho D. Ta
(74) Attorney, Agent, or Firm—Workman, Nydegger & Seeley (57) ABSTRACT

A combination PC card for use in facilitating communication between a host computer and a remote device. The combination PC card includes two RJ-type connectors, an RJ-11 connector and an RJ-45 connector, centered at a front edge of the combination PC card. The connector bodies are integral with a housing of the combination PC card and are arranged and configured to be received in a corresponding recess defined by a Type II PC card when the combination PC card and the Type II PC card simultaneously reside in a PC card slot of the host computer. The positioning and configuration of the connector bodies permits the combination PC card to be removed from the PC card slot without also necessitating the removal of the other PC card residing in the PC card slot. The combination PC card additionally includes an analog modem connected to the RJ-11 connector, and a network interface card connected to the RJ-45 connector. The analog modem and network interface card are electrically connected to the host computer by way of a PCMCIA standard 68-socket connector, which also physically connects the combination PC card to the host computer.

36 Claims, 6 Drawing Sheets

U.S. PATENT DOCUMENTS

| | | | |
|---|---|---|---|
| 5,336,099 A | 8/1994 | Aldous et al. | 439/131 |
| 5,338,210 A | 8/1994 | Beckham et al. | 439/131 |
| 5,364,294 A | 11/1994 | Hatch et al. | 439/676 |
| 5,391,083 A | 2/1995 | Roebuck et al. | 439/76 |
| 5,391,094 A | 2/1995 | Kakinoki et al. | 439/638 |
| 5,411,405 A | 5/1995 | McDaniels et al. | 439/131 |
| 5,425,660 A | 6/1995 | Weikle | 439/676 |
| 5,457,601 A | 10/1995 | Georgopulos et al. | 361/686 |
| 5,478,261 A | 12/1995 | Bogese, II | 439/676 |
| 5,481,616 A | 1/1996 | Freadman | 381/90 |
| 5,499,923 A | 3/1996 | Archibald et al. | 439/26 |
| 5,505,633 A | 4/1996 | Broadbent | 439/329 |
| 5,509,811 A | 4/1996 | Homic | 439/55 |
| 5,538,442 A | 7/1996 | Okada | 439/676 |
| 5,547,401 A | 8/1996 | Aldous et al. | 439/676 |
| 5,561,727 A | 10/1996 | Akita et al. | 385/88 |
| 5,562,504 A | 10/1996 | Moshayedi | 439/638 |
| 5,580,274 A | 12/1996 | Tsair | 439/571 |
| 5,608,607 A | 3/1997 | Dittmer | 361/686 |
| 5,634,802 A | 6/1997 | Kerklaan | 439/131 |
| 5,660,568 A | 8/1997 | Moshayedi | 439/654 |
| 5,667,390 A | 9/1997 | Keng | 439/76.1 |
| 5,679,013 A | 10/1997 | Matsunaga et al. | 439/144 |
| 5,697,815 A | 12/1997 | Drewnicki | 439/638 |
| 5,727,972 A | 3/1998 | Aldous et al. | 439/655 |
| 5,773,332 A | 6/1998 | Glad | 439/344 |
| 5,797,771 A | 8/1998 | Garside | 439/610 |
| 5,816,832 A | 10/1998 | Aldous et al. | 439/131 |
| 5,876,218 A | 3/1999 | Liebenow et al. | 439/74 |
| 5,938,480 A | 8/1999 | Aldous et al. | 439/676 |
| 5,980,322 A | 11/1999 | Madsen et al. | 439/621 |
| 5,984,731 A | 11/1999 | Laity | 439/676 |
| 5,989,042 A | 11/1999 | Johnson et al. | 439/131 |
| 6,005,774 A | 12/1999 | Chiba et al. | 361/737 |
| 6,033,240 A | 3/2000 | Goff | 439/131 |
| 6,116,962 A | 9/2000 | Laity | 439/676 |
| 6,217,391 B1 | 4/2001 | Colantuono et al. | 439/676 |
| 6,341,069 B1 * | 1/2002 | Torlotin | 439/946 |
| 6,183,307 B1 * | 2/2002 | Laity et al. | 439/676 |

* cited by examiner

PC CARD CONFIGURATION

RELATED APPLICATION

The present application relates to co-pending U.S. patent applications Ser. No. 09/795,506 entitled Wireless PC Cd and Ser. No. 09/795,169, entitle Multiple Form Factor PC Card Communication System, both having been filed the same day herewith and both being incorporated herein in their respective entireties by this reference.

BACKGROUND OF THE INVENTION

THE FIELD OF THE INVENTION

The present invention relates generally to expansion PC cards used to expand the functional capabilities of a host device. More particularly, embodiments of the present invention relate to an improved PC card having a physical configuration enhances the operational flexibility of the card when used with other PC cards in the host device.

THE RELEVANT TECHNOLOGY

Advances in the power and sophistication of computer application software, operating systems, communications software, and peripheral devices have required the development of computers with greater processing speeds and capacities. At the same time however, the pressure to at least maintain, and preferably reduce, the physical size of the computer and its various components has increased as well. Accordingly, downsizing and miniaturization of computer components is an issue of great importance in the industry.

To that end, manufacturers have developed an increasing number of miniature portable expansion devices to add functionality to host devices. One example of these expansion devices are known as "PC cards." Examples of such PC cards include cards that increase the memory storage of a host; cards that provide for "wired" communications, such as modem cards and network interface cards; and cards that provide for wireless communication. The typical PC card was designed to plug into a port, slot, or socket in the host device. As a result, PC cards serve to expand the power and functional capability of the host device without significantly increasing the size of the physical envelope of the host.

Increasingly, such expansion devices are built in accordance with prescribed physical and electrical standards, so as to insure compatibility from one manufacture to another. For example, a number of manufacturers collaborated to fom the Personal Computer Memor y Card International Association (PCMCIA), which specifies standards for the physical design, dimensions, and electrical interface of PC cards. For example, PCMCIA standards provide for, among other things, Type I, Type II, and Type III form factors (hereinafter the "Type I," Type II," and "Type III" standards, as applicable) wherein each form factor is characterized by specific dimensional attributes. Generally, the length and width characteristics of all PC cards conforming to PCMCIA standards are the same. More specifically, all PC cards conforming to such standards are 85.6 millimeters long and 54 millimeters wide. The distinguishing physical characteristic among the various PCMCIA form factors is the thickness of a particular PC card. In particular, Type I cards are 3.3 millimeters thick, Type II cards are 5.0 millimeters thick, and Type III cards are 10.5 millimeters thick.

PCMCIA standards also define the electrical interface requirements for both the card and the host device. A host device will typically include one or more PC card slots, having PCMCIA-defined electrical and physical interfaces. For example, a common configuration provides two adjacent slots, which each include a 68-pin connector for physically and electrically interfacing with the received PC card.

In the PCMCIA slot configuration of many host devices, PC cards having dissimilar form factors, such as a Type II card and a Type III card, cannot simultaneously reside in adjacent PCMCIA slots, due to the increased proximity of the 68-pin connectors and the height profile of the Type III card. This can limit a user's ability to utilize multiple PC cards. For example, a "combo" PC card that provides "wired" communications—such as modem and LAN communications—may have integrated RJ-modular receptacles (e.g., RJ-11, RJ-45) that present a card height similar to a Type III thickness. Until now, the presence of such a card could preclude the simultaneous use of another Type II card, such as one that provides for wireless communications, in an adjacent slot. In this situation, the user must first physically remove the Type III card, and then insert the Type II card. Obviously, this is inconvenient, time consuming, and limits the functionality available to the host device at any given time.

The ability to utilize adjacent expansion cards is further limited when one of the cards requires a particular physical configuration—such as a PC card providing wireless communication functions. For example, if a card is residing in an adjacent slot, its presence may limit the ability to provide optimal antenna separation in a wireless PC card. In general, wireless PC card performance increases with antennae separation, so as to reduce so-called "dead spots" of a wireless signal. Accordingly, where the antennae are disposed relatively close to each other, the effectiveness of the wireless PC card can be impaired. Furthermore, optimally the antennae should protrude from the front face of the host computer in order to be most effective. Both objectives are difficult to achieve, especially when another PC card is positioned within an adjacent slot.

In view of the foregoing problems and shortcomings, and others, with existing PC cards, it would be an advancement in the art to provide a PC card having a geometry sensitive to the operational considerations and performance requirements of other PC cards which may be used contemporaneously with the PC card in an adjacent slot. Further, embodiments of the improved PC card should be configured so that contemporaneous use with another PC card is possible even where such other PC cards have a form factor different than that of the combination PC card. Finally, embodiments of the improved PC card should include one or more full height connectors having bodies configured and arranged to permit simultaneous use of a wireless PC card in an adjacent PC card slot, but without imposing geometric or other restrictions on the wireless PC card that would impair its effectiveness and performance.

SUMMARY OF PRESENTLY PREFERRED EMBODIMENTS OF THE INVENTION

The present invention has been developed in response to the current state of the art, and in particular, in response to these and other problems and needs that have not been fully or adequately resolved by currently available expansion PC cards, and related cards that conform to a particular standard. Thus, it is an overall objective to provide a PC card that has a geometry sensitive to the operational considerations and performance requirements of other PC cards that are to be used simultaneously in a host device.

Embodiments of the present invention are well suited for use in 32 bit CardBus-compliant host devices having at least two adjacent electrical connectors. However, it will be appreciated that embodiments of the present invention may be suitable for use in conjunction with a variety of different types of host computers and/or with various other PC cards conforming to any of a number of other standards, form factors, or geometric configurations including, but not limited to, 16 PC Card standards.

In one embodiment of the present invention, a PC card is provided that includes a main housing portion having a geometry conforming to the PCMCIA Type II standard. Another portion of the housing exceeds the thickness specified by the Type II standard. For example, in the illustrated embodiment, the PC card includes two integrated RF-type modular connector receptacles, that exceed the Type H height limitations and present a height that approximates that of a Type III thickness. The connectors are positioned at the center of the front edge of the PC card. One of the connectors can be an RJ-11 type-modular receptacle for receiving a standard modular communications telephone plug. The other can be an RJ-45 type-modular receptacle for receiving a communications plug of the type typically employed when interfacing with local area networks (LAN). The PC card also includes electronic circuitry, for example, analog modem circuitry connected to the RJ-11 connector, and network interface circuitry connected to the RJ-45 connector. Both the analog modem and the network interface circuits are, in turn, connected to a PCMCIA standard 68 socket connector located at the rear of the PC card and configured to slidingly mate with a corresponding 68 pin computer or other electronic host device, such as a personal computer or the like.

In operation, the PC card is inserted in the PC card slot in the host computer so that the connector of the PC card is releasably engaged, physically and electrically, by the: connector in the PC card slot. In this way, electrical communication is established between the host computer and the PC card. The PC card, in turn, communicates with one or more remote devices and/or networks by way of the integrated RJ-11 and RJ-45 connectors. Moreover, the RJ-11 and RJ-45 connectors are positioned and orientated at the front end of the PC card in a manner so that an additional PC card can reside within an immediately adjacent slot—notwithstanding the presence of the integrated modular receptacles.

By way example, the additional complementary PC card preferably comprises a PC card with a housing that defines a structure that is complementary to that of the above-defined card. For example, in one embodiment, the complimentary card has a housing that defines a recess that accommodates the unique arrangement and positioning of the RJ-type receptacles of the adjacent PC card when the two cards are simultaneously positioned in adjacent PC card slots. In addition, the modular receptacles in the first card, and the recess in the other, are positioned, oriented and shaped so as to permit removal of one card, without necessitating the removal of the other PC card in the adjacent PC card slot.

Embodiments of the present invention serve a variety of useful purposes including, but not limited to, enhancing the overall operational flexibility of the host computer by allowing contemporaneous use of other PC cards which rely for their effective operation on particular geometric characteristics and considerations.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF EMBODIMENTS OF THE INVENTION

Reference will now be made to figures wherein like structures will be provided with like reference designations. It is to be understood that the drawings are diagrammatic and schematic representations of various embodiments of the claimed invention, and are not to be construed as limiting the present claimed invention, nor are the drawings necessarily drawn to scale.

Figure 1:
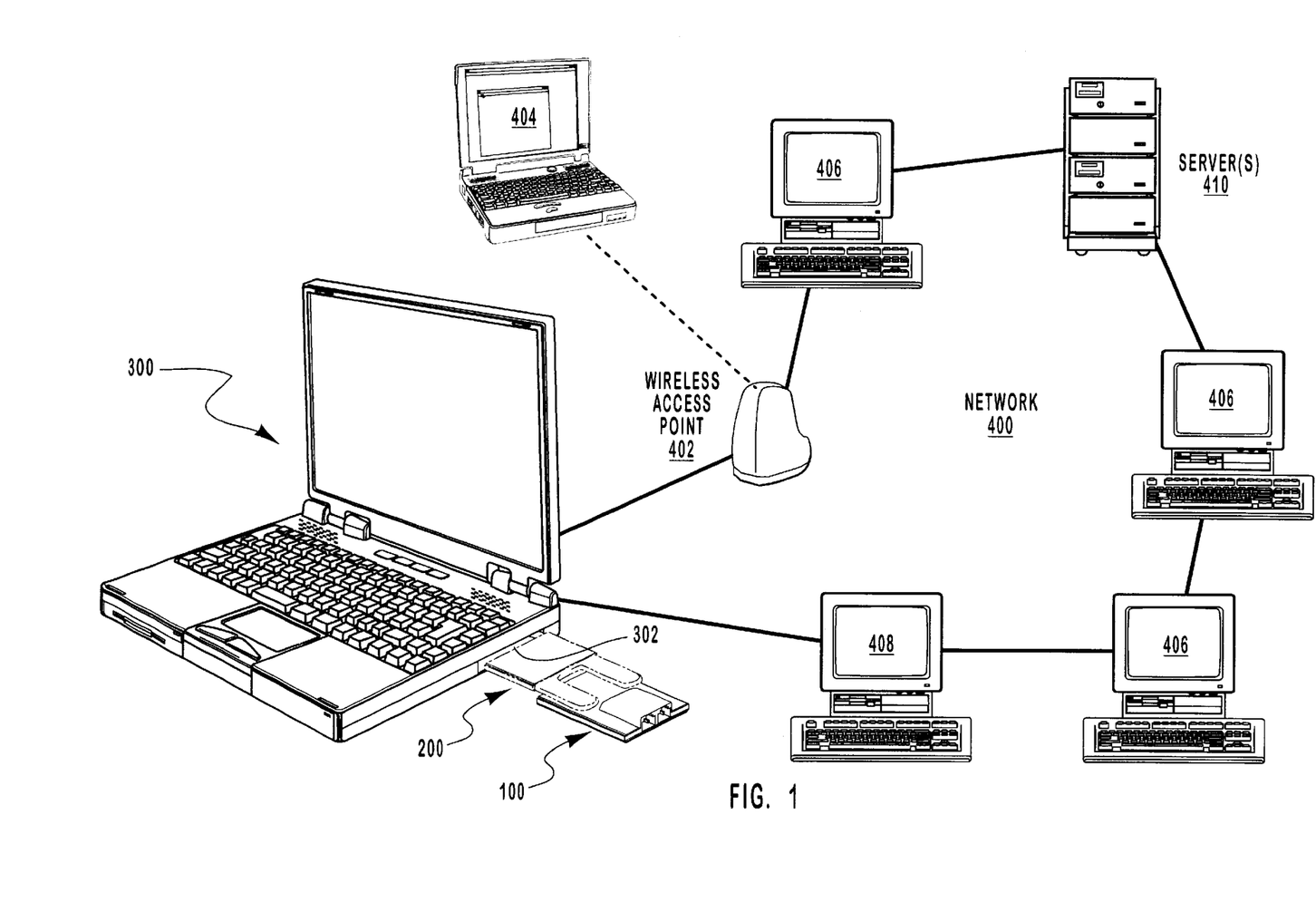
FIG. 1 illustrates an exemplary operating environment for embodiments of the present invention.

Reference is first made to FIG. 1, wherein a PC card constructed in accordance with the teachings of the present invention is indicated generally at 100. The illustrated card is commonly referred to as a "combination" PC card, in that it is a PC card that incorporates a plurality of functionalities. One example of such a combination PC card is one which includes both an RJ-11 and RJ-45 connector, each of which has associated therewith a particular functionality. In this example, the RJ-11 connector permits the combination PC card to communicate with remote devices via the public telephone network, and the RJ-45 connector permits the combination PC card to communicate with networks such as Ethernet Local Area Networks (LAN). Thus, the exemplary combination PC card possesses at least two different functionalities.

As suggested in FIG. 1, the host device 300 (such as a notebook computer) is equipped with a slot 302 that is able to functionally accommodate two adjacent PC cards having a Type II form factor, or a single PC card having a Type III form factor. However, as will be discussed further, combination PC card 100 may be used either alone or contemporaneously with another complimentary PC card 200. PC card 200 may incorporate any of a variety of functionalities. For example, PC card 200 may comprise a wireless PC card which is effective in facilitating wireless communications between a host device and any of a variety of other systems and remote devices. Both combination PC card 100 and PC card 200 are configured to physically and electrically interface with a host computer 300 having one or more PC card slots 302. It will be appreciated that host computer 300 may conform to any of a variety of configurations including, but not limited to, a laptop computer or other type of portable computer, a standard desktop personal computer, a handheld electronic device, any device configured for use with a peripheral such as a PCMCIA device or the like.

As noted, in order that an effective physical and electrical interface be achieved between a PC card and the host device 300, host computer 300 includes a slot 302 having two adjacent 68 pin connectors and appropriate slots to operatively receive a PC card. Again, slot 302 permits for simultaneous reception of two Type II PC cards, or a single Type M card. However, as discussed in greater detail below, embodiments of combination PC card 100 having integrated receptacles presenting a height similar to the thickness specified by the Type III standard, may be simultaneously received in PC card slot 302 with another adjacent complimentary PC card conforming, for example, to the Type II standard.

While at least some embodiments of the present invention preferably conform to PCMCIA standard form factors, the scope of the present invention should not be construed to be limited solely to combination PC cards conforming to PCMCIA form factors, electrical parameters, and operational parameters. Rather, it will be appreciated that combination PC card 100 may be configured to individually and/or collectively conform to various other physical and electrical standards, form factors, and the like, as required to suit a particular application or computer hardware, and/or to facilitate achievement of one or more desired results.

In one embodiment of the present invention, combination PC card 100 facilitates the connection of host computer 300 to network 400, and the transmission of communications therebetween. Network 400 may comprise both wireless and hardwired remote devices or, alternatively, only hardwired devices. As contemplated herein, a "hardwired" device or "hardwire" connection refers to arrangements, connections, and. devices wherein a physical connection between computers and other devices is implemented which facilitates communication therebetween. On the other hand, a "wireless" device or "wireless" connection refers to arrangements, connections, and devices wherein computers and devices are able to communicate with each other by way of radio signals or the like and, accordingly, do not require a physical connection with each other. Note that additional details regarding the specific nature of the connections between host computer 300, and network 400 and/or various remote devices, are provided below in the context of the discussion of FIGS. 2 and 3.

With continuing reference to FIG. 1, it will be appreciated that network 400 may comprise various types of hardwired and wireless remote devices, consistent with variables including, but not limited to, installation constraints, operational requirements of the network, cost considerations, and the like. In the exemplary embodiment illustrated in FIG. 1, network 400 includes, among other things, a wireless access point 402 configured for hardwire based communication with host computer 300. As discussed in further detail below, wireless access point 402 serves to facilitate communication between host computer 300 and one or more remote devices. It will be appreciated however, that wireless access point 402 may be omitted without impairing the functionality of embodiments of the present invention.

Additionally, network 400 preferably includes one or more remote computers 404 configured for wireless communication with wireless access point 402, as well as one or more remote computers 406 and 408 either directly connected to host computer 300, or configured and arranged for communication with host computer 300 by way of one or more intermediate remote computers. It will be appreciated that network 400 may additionally include one or more hardwired servers 410 in communication with remote computers 404, 406, and 408, as well as one or more wireless servers (not shown) configured for wireless communication with wireless access point 402 and/or remote computer 404.

Note that, as suggested above, "remote device" refers to any device or system configured for communication with host computer 300, either indirectly, such as in the case of remote computers 404 and 406, or directly, such as in the case of wireless access point 402 and remote computer 408. Furthermore, "remote device" not only comprehends the device, or devices, such as remote computers 404, 406, and 408, which is/are the ultimate destination, or origination point, of communications, but may additionally or alternatively comprise intermediate devices, such as wireless access point 402 which, while they transmit/receive communications to/from host computer 300 and/or one or more remote devices, may not be the ultimate destination for such communications.

Finally, while embodiments of the present invention may be usefully employed in the context of operating environments such as network 400, it will be appreciated that other operating environments for embodiments of the present invention are likewise appropriate. Thus, embodiments of the present invention may be used to facilitate hardwire based communication between host computer 300 and, for example, cellular, satellite, or hardwired telephones, so-called "personal data assistants" (PDA), wireless access point 402, and a variety of other systems and devices.

Directing continuing attention to FIG. 1, various details are provided regarding operational features of an embodiment of the present invention. In the case of the illustrated embodiment, a communication initiated at host computer 300 is passed to one or more remote devices of network 400 by way of combination PC card 100 and, or alternatively, a communication is initiated at one or more remote devices and transmitted to host computer 300 by way of combination PC card 100. Thus, combination PC card 100 acts as an interface which facilitates communication between host computer 300 and one or more remote devices. As contemplated herein, subject matter transmitted by way of such "communications" includes, but is not limited to, data, electronic mail, instructions, programs, files, electronic media, and any other material embodied in a form capable of being transmitted from or to host computer 300 by way of combination PC card 100.

As suggested above, communications initiated at host computer 300 may be transmitted to any of a variety of remote devices. In the context of network 400, for example, a communication initiated at host computer 300 may be transmitted to wireless access point 402, by way of combination PC card 100, and then relayed by wireless access point 402 to one or more hardwired devices, such as remote computers 406 and 408, connected to wireless access point 402, and/or to one or more wireless remote devices such as remote computer 404. It will be appreciated that communication between host computer 300 and one or more remote devices, by way of combination PC card 100, may be performed in response to input provided to host computer 300 by a user, and/or may be performed automatically according to various criteria embodied in hardware and/or software associated with host computer 300. Likewise, it will be appreciated that communication with host computer 300 may be initiated by, or at, one or more remote devices, including, but not limited to, remote computers 404, 406 and 408, and wireless access point 402.

Figure 2:
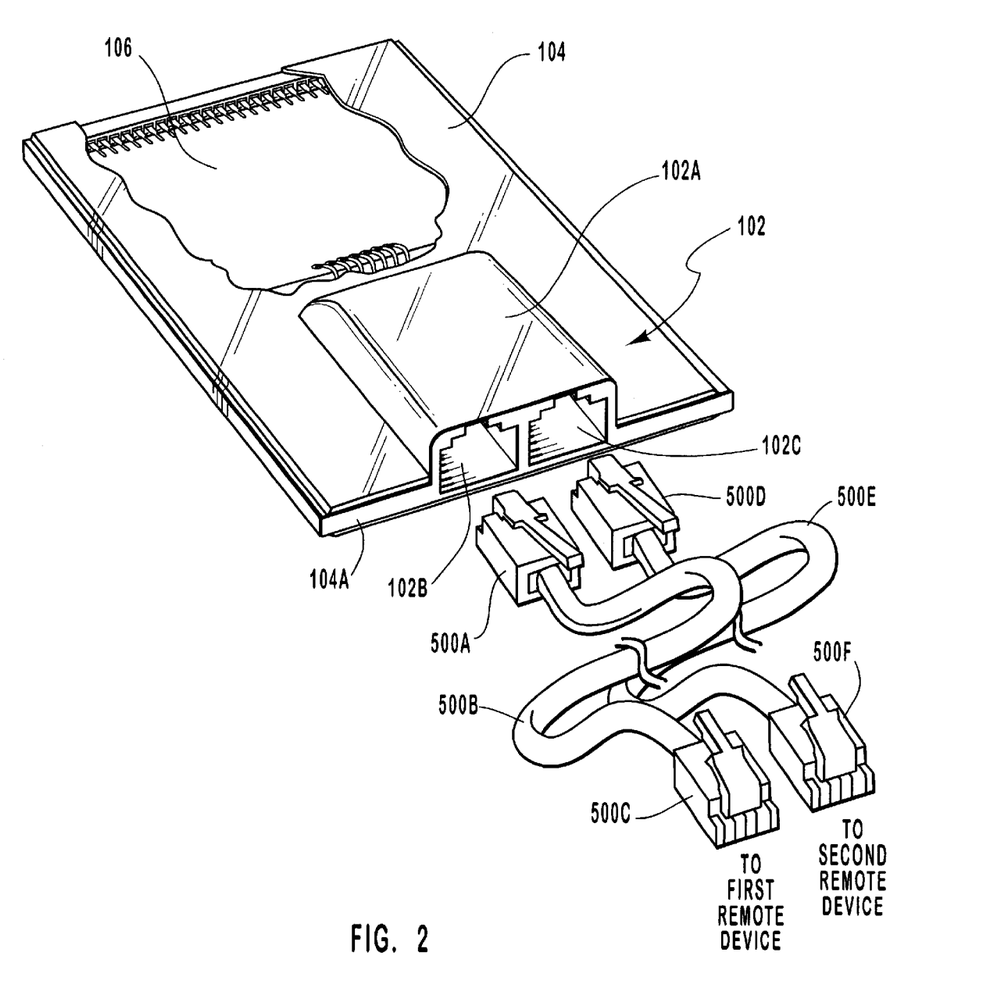
FIG. 2 is a front perspective view depicting various details of an embodiment of the present invention.
Figure 3:
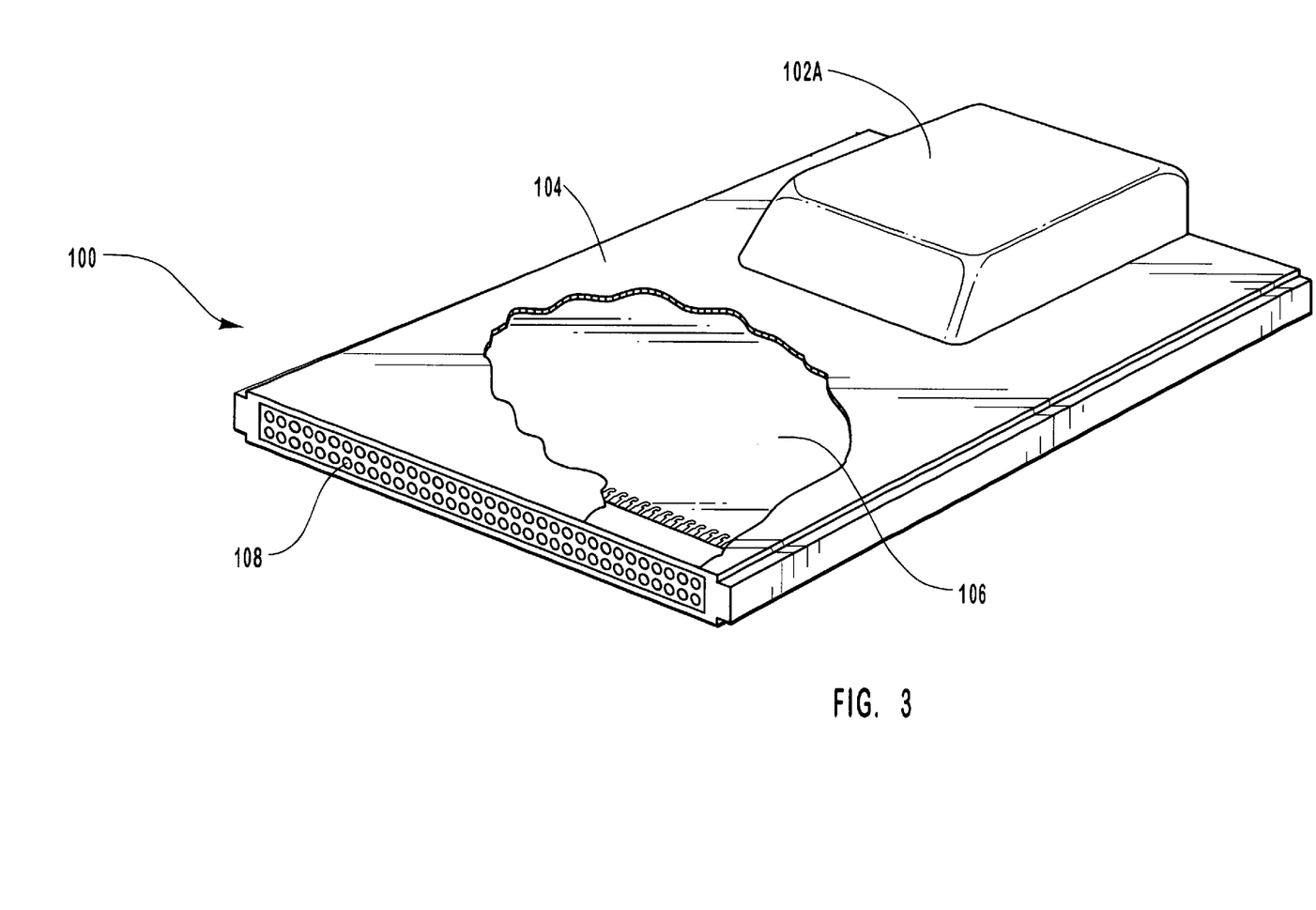
FIG. 3 is a rear perspective view depicting various details of an embodiment of the present invention.

Directing attention now to FIGS. 2 and 3, additional details are provided regarding various features of an embodiment of combination PC card 100 which includes, among other things, two integrated connector receptacles 102B and 102C, and a main housing portion 104. Preferably the main housing portion 104 conforms to the Type II PCMCIA standards for length and width. Housing 104 includes, among other things, front edge 104A.

As indicated in FIGS. 2 and 3, in one preferred embodiment, connector. receptacle 102 is formed as a single, integrally formed connector body housing 102A that at least partially defines receptacles 102B and 102C. Preferably, connector body 102A is formed as an integral piece with main housing 104 portion of combination PC card 100. However, it will be appreciated that connector body 102A may, alternatively, constitute a structure distinct from housing 104. In yet another arrangement, connector body 102A may comprise two distinct portions, one such portion at least partially defining receptacle 102B, and another such portion at least partially defining receptacle 102C.

In the exemplary embodiment illustrated in FIGS. 2 and 3, receptacle 102B of connector 102 is configured to removably receive an RJ-11 type communications plug 500A that is connected to a communications wire, 500B which includes another plug 500C configured to physically and electrically interface with the public telephone network. Receptacle 102C is configured to removably receive an RJ-45 type communications plug 500D that is connected to a communications wire 500E which includes another communications plug 500E configured to physically and electrically interface with a local area network medium (not shown).

While some embodiments of combination PC card 100 include one or more RJ-type connectors configured to physically and electrically interface with RJ-type communication plugs, it will be appreciated that connectors 102 may comprise any of a variety of arrangements configured to provide a physical and electrical interface between combination PC card 100, and thus host computer 300, and one or more remote devices. For example, one or more of connectors 102 may alternatively comprise a coaxial connection, a cell phone interface, a PDA interface, or one of the various types of multisocket connectors configured to receive a multi-pin plug. It will further be appreciated, that variables including, but not limited to, the size, shape, type, and number of connectors 102 may be varied, either alone or in various combinations, as required to suit particular applications and/or to facilitate achievement of one or more desired results.

Figure 4:
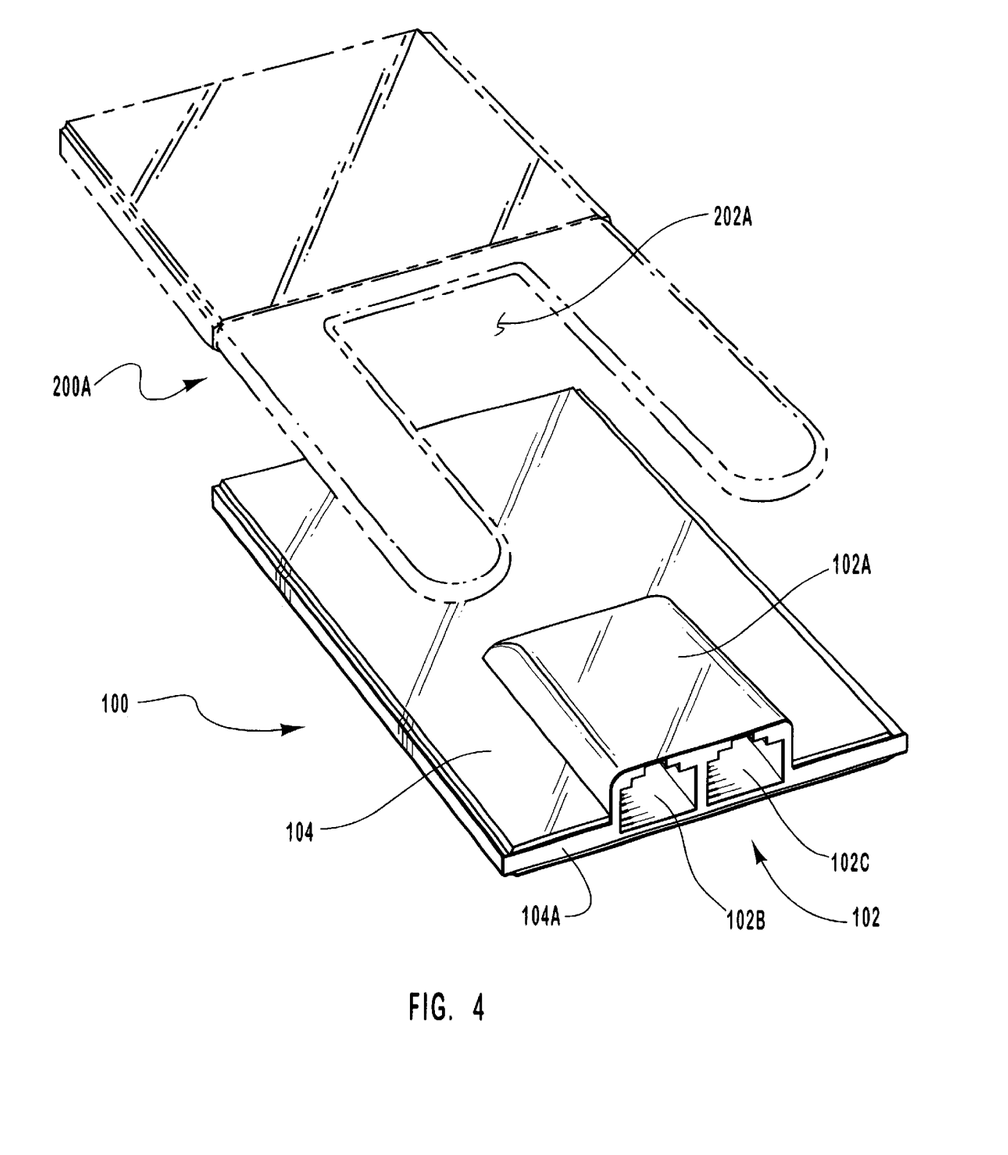
FIG. 4 is an exploded front perspective view illustrating an exemplary application of an embodiment of the present invention.
Figure 5:
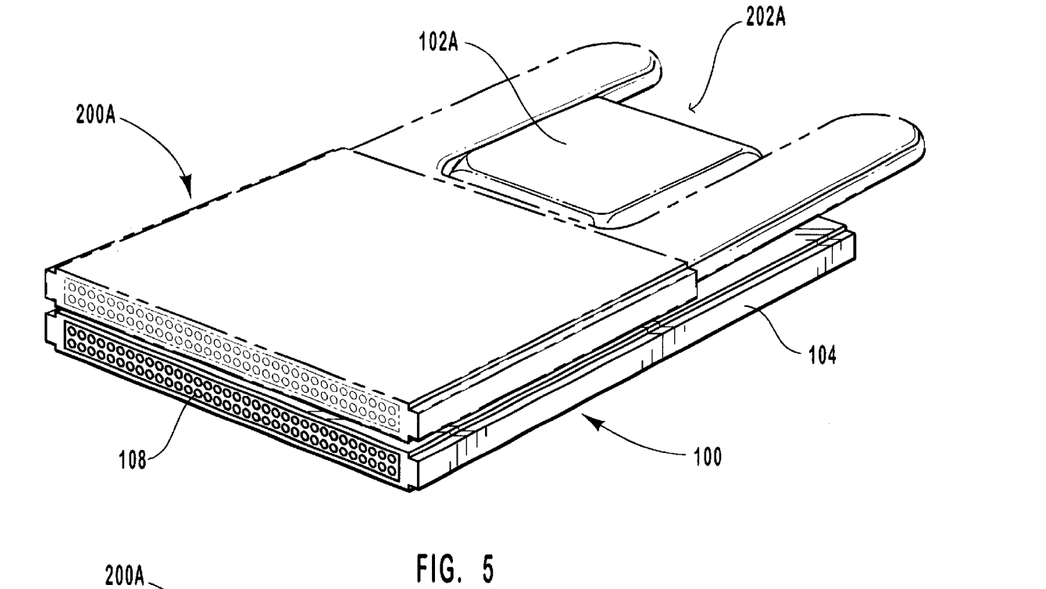
FIG. 5 is a rear perspective view of the exemplary application illustrated in FIG. 4.
Figure 6:
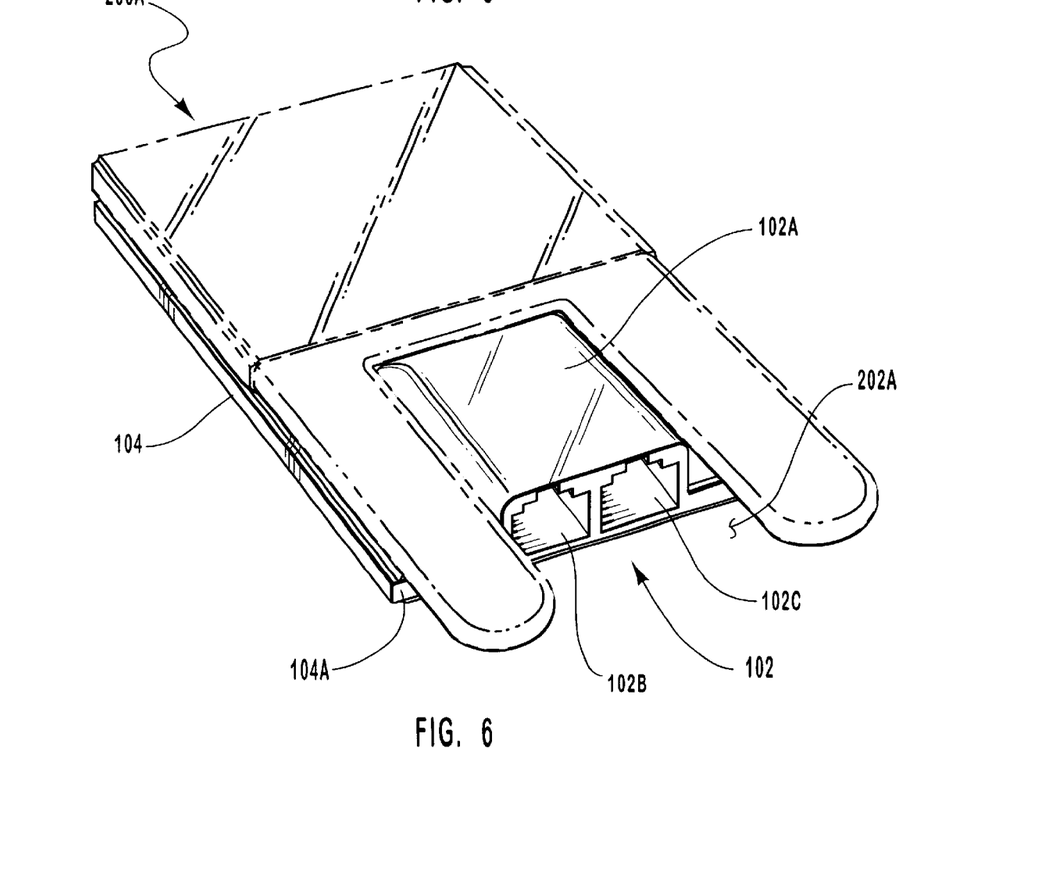
FIG. 6 is a front perspective view of the exemplary application illustrated in FIG. 4.
Figure 7:
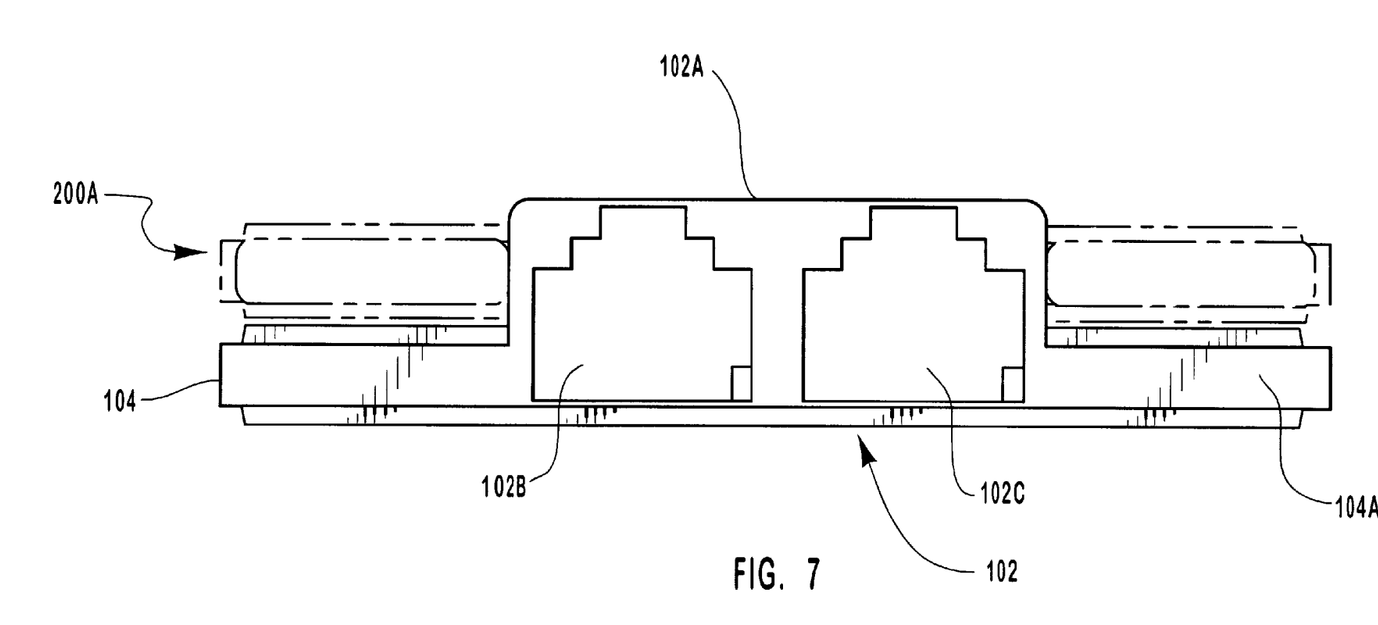
FIG. 7 is a front end view of the exemplary application illustrated in FIG. 4.

Furthermore, the configuration and/or arrangement of connectors 102 may be modified as required to produce embodiments of combination PC card 100 that possess a geometry that is sensitive to particular geometric constraints or requirements of another complimentary PC card which is desired to be used simultaneously with combination PC card 100 in PC card slot 302 of host computer 300 (see FIG. 1). Further details regarding one exemplary arrangement are provided below in the context of the discussion of FIGS. 4, 5, and 6.

With continuing reference now to FIGS. 2 and 3, combination PC card 100 additionally includes electronic circuitry 106 disposed substantially within housing 104, and in electrical communication with connectors 102. In general, electronic circuitry 106 comprises circuits, devices, wiring, processors, integrated circuits, indicators, and the like, necessary to implement the functionality of combination PC card 100. In one embodiment, electronic circuitry 106 comprises an analog modem and a network interface circuit.

As indicated in FIG. 3, combination PC card 100 further includes connector 108, preferably comprising a PCMCIA standard 68socket configuration, which serves to physically connect combination PC card 100 to a mating connector in PC card slot 302 of host computer 300, as well as to electrically connect electronic circuitry 106 to host computer 300. It will be appreciated that connector 108 may take any of a variety of other forms as may be required for consistency and compatibility with the configuration of host computer 300, PC card slot 302, other hardware, and/or applicable electrical power constraints. Accordingly, the scope of the present invention should not be construed to be limited solely to standard 68socket connectors. Finally, it will be appreciated that a variety of means may be profitably employed to perform he functions, enumerated herein, of connector 108. Accordingly, connector 108 is but one example of a means for physically and electrically connecting combination PC card 100 to host computer 300. It should be understood that the embodiment of connector 108 is presented herein solely by way of example and should not be construed as limiting the scope of the present invention in any way.

In fact, the functionality provided by connector 108 may be provided in any of a variety of different ways. As in the case of the illustrated embodiment, both the electrical connection and the physical connection functions may be performed by a single structural element. In one alternative embodiment, a means for physically and electrically connecting combination PC card 100 to host computer 300 includes within its purview, arrangements comprising one structure for electrically connecting combination PC card 100 to host computer 300, such as a plurality of electrical contacts arranged for sliding surface engagement with mating contacts in PC card slot 302, and a separate structure for physically connecting combination PC card 100 to host computer 300, such as locking tabs or the like.

As noted above, connector body housing 102A and connectors 102 are preferably arranged and configured so as to define a geometry sensitive to the geometric and operational requirements of other PC cards which are desired to be used in PC card slot 302 contemporaneously with combination PC card 100. With reference now to FIGS. 4 through 7, and with continuing reference to FIGS. 2 and 3, one exemplary arrangement of connectors 102 is indicated. Generally, connector body 102A is positioned at the center of front edge 104A of housing 104 of combination PC card 100 so as to comport with the split antenna geometry of a complimentary wireless PC card 200A. The shape and positioning of the integrated receptacles thus facilitate contemporaneous use of wireless PC card 200A in an adjacent PC card slot 302, notwithstanding the fact that the full height profile of the receptacles would otherwise block access to the adjacent slot.

More specifically, connector body 102A is configured and arranged so as to be at least partially received in the recess portion 202A defined by the housing of wireless PC card 200A. In this exemplary configuration, wireless PC card 200A conforms substantially to the PCMCIA Type II form factor. Combination PC card 100, due to the presence of connectors 102 conforming to RJ-type standards, at least partially comports substantially with the Type III form factor—at least with respect to the thickness presented via the integrated receptacles. Thus, when disposed together in the exemplary configuration indicated in FIGS. 4 through 7, combination PC card 100 and wireless PC card 200A collectively conform to the Type III form factor. Accordingly, it is a feature of embodiments of the present invention that the simultaneous use of a Type II PC card and a Type III PC card in adjacent 68pin connectors is made possible.

Further, in the exemplary embodiment illustrated in FIGS. 4 through 7, combination PC card 100 is characterized by a geometry that facilitates the antenna separation that is required for optimum performance of wireless PC card 200A. Specifically, the positioning of connector body housing 102A of combination PC card 100 is consistent with the requirement, typical of wireless PC cards, that the antennae of such wireless PC cards be separated to the maximum extent practicable in order to better facilitate optimal operation of the wireless PC card. That is, the geometry of the illustrated embodiment of combination PC card permits the simultaneous use of wireless PC cards having a geometry directed toward maximizing the distance between antennae disposed in such wireless PC card. It will be appreciated that while this exemplary embodiment of combination PC card 100 has a geometry which makes it well suited for contemporaneous use with a wireless PC card 200A, it will be appreciated that various other embodiments of combination PC card 100 may be employed that are suitable for use with other PC cards 200 having different geometries, operational requirements, and functionalities. It will also be appreciated that the complimentary portion of the PC card 100 could present other geometries so as to comport with the shape of an adjacent card. For example, the connector body housing 102A could include slots and/or rails, designed to provide a mechanical fit with portions of the adjacent card 200A. Other locking and/or guiding mechanisms could also be used, to provide functional fit between the adjacent cards.

Another feature relating to the operational flexibility facilitated by embodiments. of combination PC card 100 concerns the interaction between combination PC card 100 and, for example, wireless PC card 200A when it is desired to remove and/or replace wireless PC card 200A from PC card slot 302. As noted above, connector body housing 102A of combination PC card 100 is configured and arranged to be removably received within the recess 202A defined by wireless PC card 200A. Consequently, combination PC card 100 can be readily removed and replaced without also necessitating the removal of wireless PC card 200A from PC card slot 302. This feature serves to enhance the operational flexibility of host computer 300 by permitting removal and/or replacement of combination PC card 100 without compromising the integrity of the wireless connection implemented by way of wireless PC card 200A.

Thus, the present invention represents an improvement over known combination PC cards, typically characterized by various geometric features that impose operational or other restrictions on PC cards used contemporaneously in adjacent PC card slots. In particular, embodiments of the present invention allow two cards to reside in adjacent slots, even though one of the cards presents a form factor that would otherwise prevent the use of another adjacent card. For example, the presence of connector receptacles, full height RJ-type connectors, permits combination PC card 100 to be used to facilitate communication between host computer 300 and various remote devices. The connectors 102 are configured and arranged in a manner that is sensitive to the specific geometric requirements of other PC cards, such as a wireless PC card which are desired to be used contemporaneously with combination PC card 100 in an adjacent PC card slot. The connectors are configured and arranged to permit removal of combination PC card 100 from PC card slot 302, without also necessitating the removal of the other PC card residing in the adjacent PC card slot.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A peripheral device adapted to be electrically and physically received by a lot in a host device and capable of facilitating communication between host device and a communication system, the device comprising:

(a) a main housing having a main portion with a width conforming substantially to the PCMCIA standard, and a height conforming substantially to the PCMCIA Type II standard;

(b) at least one connector receptacle formed within a connector body disposed integrally within the main housing, the connector body having a height greater than the Type II standard, and being shaped so as to be capable of being at least partially received within a recess formed in a second device electrically received within a slot adjacent to the peripheral device;

(c) electronic circuitry substantially disposed within said main housing and being in electrical communication with electrical contacts disposed within the receptacle; and (d) means for physically and electrically connecting the peripheral device to the host device.

2. The combination PC card as recited in claim 1, wherein said at least one connector comprises at least one RJ-type connector.

3. The combination PC card as recited in claim 1, wherein said at least one connector comprises two RJ-type connectors.

4. The combination PC card as recited in claim 1, wherein said connector body is centered in a front edge of the combination PC card.

5. The combination PC card as recited in claim 1, wherein said connector body is formed integrally with said main housing.

6. The combination PC card as recited in claim 1, wherein said second form factor comprises a PCMCIA Type III form factor.

7. The combination PC card as recited in claim 1, wherein said third form factor comprises a PCMCIA Type III form factor.

8. The combination PC card as recited in claim 1, wherein said first form factor and said third form factor are the same.

9. The combination PC card as recited in claim 1, wherein said electronic circuitry comprises an analog modem.

10. The combination PC card as recited in claim 1, wherein said electronic circuitry comprises a network interface card.

11. The combination PC card as recited in claim 1, wherein said means for physically and electrically connecting the combination PC card to the host computer comprises a PCMCIA standard sixty eight socket connector in electrical communication with said electronic circuitry.

12. For use in conjunction with a host computer including a PC card slot, a combination PC card for facilitating communication between the host computer and a remote device, the combination PC card conforming to a first form factor and comprising:
   (a) a housing;
   (b) at least one connector, said at least one connector including a connector body configured and arranged so that when said connector body is at least partially received in a corresponding recess defined by another PC card conforming to a second form factor different from the first form factor of the combination PC card, the combination PC card and the another PC card collectively conform to a third form factor compatible with the PC card slot;
   (c) electronic circuitry substantially disposed within said housing and being in communication with said at least one connector; and
   (d) means for physically and electrically connecting the combination PC card to the host computer.

13. The combination PC card as recited in claim 12, wherein said connector body is arranged and configured so that when the combination PC card and the another PC card simultaneously reside in the PC card slot, the combination PC card can be removed from the PC card slot without requiring removal of the another PC card.

14. The combination PC card as recited in claim 12, wherein said at least one connector comprises at least one RJ-type connector.

15. The combination PC card as recited in claim 12, wherein said at least one connector comprises two RJ-type connectors.

16. The combination PC card as recited in claim 12, wherein said connector body is centered in a front edge of the combination PC card.

17. The combination PC card as recited in claim 12, wherein said connector body is integral with said housing.

18. The combination PC card as recited in claim 12, wherein said third form factor comprises a PCMCIA Type III form factor.

19. The combination PC card as recited in claim 12, wherein said electronic circuitry comprises an analog modem.

20. The combination PC card as recited in claim 12, wherein said electronic circuitry comprises a network interface card.

21. The combination PC card as recited in claim 12, wherein said means for physically and electrically connecting the combination PC card to the host computer comprises a PCMCIA standard sixty eight socket connector in electrical communication with said electronic circuitry.

22. A computer system configured for communication with a remote device, the computer system comprising:
   (a) a host computer including a PC card slot; and
   (b) a combination PC card conforming to a first form factor, said combination PC card being received in said PC card slot and comprising:
      (i) a housing;
      (ii) at least one connector, said at least one connector including a connector body configured and arranged so that when said connector body is at least partially received in a corresponding recess defined by another PC card conforming to a second form factor different from said first form factor of said combination PC card, said combination PC card and the another PC card collectively conform to a third form factor compatible with said PC card slot;
      (iii) electronic circuitry substantially disposed within said housing and being in communication with said at least one connector; and
      (iv) means for physically and electrically connecting said combination PC card to said host computer.

23. The computer system as recited in claim 22, wherein said connector body is arranged and configured so that when said combination PC card and the another PC card simultaneously reside in said PC card slot, said combination PC card can be removed from said PC card slot without requiring removal of the another PC card.

24. The computer system as recited in claim 22, wherein said first form factor comprises a PCMCIA Type III form factor.

25. The computer system as recited in claim 22, wherein said PC card slot conforms to a PCMCIA Type II form factor.

26. The computer system as recited in claim 22, wherein said first form factor and said third form factor are the same.

27. The computer system as recited in claim 22, wherein said at least one connector comprises at least one RJ-type connector.

28. The computer system as recited in claim 22, wherein said at least one connector comprises two RJ-type connectors.

29. The computer system as recited in claim 22, wherein said connector body is centered in a front edge of said combination PC card.

30. The computer system as recited in claim 22, wherein said electronic circuitry comprises an analog modem.

31. The computer system as recited in claim 22, wherein said electronic circuitry comprises a network interface card.

32. The computer system as recited in claim 22, wherein said host computer comprises a portable computer.

33. The combination PC card as recited in claim 22, wherein said means for physically and electrically connecting the combination PC card to said host computer comprises a PCMCIA standard sixty eight socket connector in electrical communication with said electronic circuitry.

34. A combination PC card, conforming to a Type III form factor, for use in facilitating communication between a host computer including a PC card slot, and a remote device, the combination PC card comprising:
   (a) a housing;
   (b) at least one RJ-type connector having a connector body centered at a front edge of the combination PC card and being integral with said housing, and said connector body being configured and arranged so that said connector body is at least partially received in a corresponding recess, defined by another PC card conforming to a Type II form factor, when the combination PC card and the another PC card simultaneously reside in the PC card slot;
   (c) electronic circuitry substantially disposed within said housing and being in communication with said at least one RJ-type connector; and
   (d) means for physically and electrically connecting the combination PC card to the host computer.

35. The combination PC card as recited in claim 34, wherein said at least one RJ-type connector comprises an RJ-11 connector and an RJ-45 connector.

36. The combination PC card as recited in claim 34, wherein said electronic circuitry comprises an analog modem and a network interface card.

* * * * *